US00RE35125E

United States Patent [19]

Kaneko

[11] E Patent Number: Re. 35,125

[45] Reissued Date of Patent: Dec. 19, 1995

[54] PULSE CONTROL CIRCUIT FOR ELECTRIC DISCHARGE MACHINE USING PROGRAMMABLE LOGIC

[75] Inventor: Yuji Kaneko, Yokohama, Japan

[73] Assignee: Sodick Co., Ltd., Yokohama, Japan

[21] Appl. No.: 212,722

[22] Filed: Mar. 14, 1994

Related U.S. Patent Documents

Reissue of:

[64] Patent No.: 5,182,474
Issued: Jan. 26, 1993
Appl. No.: 675,168
Filed: Mar. 26, 1991

[30] Foreign Application Priority Data

Jul. 26, 1989 [JP] Japan ..... 1-193711

[51] Int. Cl.[6] ..... B23H 7/04; H03K 19/02

[52] U.S. Cl. ..... 326/37; 219/69.18; 219/69.16

[58] Field of Search ..... 364/474.04; 219/69.13.69.16, 219/69.18; 307/465, 465.1; 326/37, 41

[56] References Cited

U.S. PATENT DOCUMENTS

| | | | |
|---|---|---|---|
| 3,988,560 | 10/1975 | Losey et al. | 219/69.18 |
| 4,078,163 | 3/1978 | Bell, Jr. et al. | 219/69.13 |
| 4,335,436 | 6/1982 | Inoue | 219/69.16 |
| 4,377,849 | 3/1983 | Finger et al. | 307/465.1 |
| 4,392,043 | 7/1983 | Inoue | 219/69.18 |
| 4,460,815 | 7/1984 | Bell, Jr. et al. | 219/69.18 |
| 4,471,198 | 9/1984 | Bell, Jr. et al. | 219/69.16 |
| 4,554,428 | 11/1985 | Takawashi et al. | 219/69.16 |
| 4,786,778 | 11/1988 | Ho et al. | 219/69.18 |
| 4,791,603 | 12/1988 | Henry | 307/465 |
| 4,894,504 | 1/1990 | Truty | 219/69.13 |
| 5,081,375 | 1/1992 | Pickett et al. | 307/465 |

FOREIGN PATENT DOCUMENTS

| | | |
|---|---|---|
| 57-129536 | 8/1982 | Japan . |
| 63-68318 | 3/1988 | Japan . |

OTHER PUBLICATIONS

The Programmable Gate Array Data Book: Xilinx Programmable Gate Arrays Design Flow, pp. 5–9 through 5–23 (1988).

*Primary Examiner*—Edward P. Westin
*Assistant Examiner*—Richard Roseen
*Attorney, Agent, or Firm*—Marks & Murase

[57] ABSTRACT

This invention provides a a ROM (10) which stores circuit function definition data for defining specified logic circuits relating to electric discharge machining and a programmable IC (20) which defines a specified logic circuit according to the circuit function definition data. This configuration is cost effective and minimizes hardware space requirements compared with configurations which used different logic circuits combined together. Further, when hardware needs to be reconfigured, the change can be achieved easily by replacing ROM (10) only.

5 Claims, 11 Drawing Sheets

PULSE CONTROL CIRCUIT FOR ELECTRIC DISCHARGE MACHINE USING PROGRAMMABLE LOGIC

Matter enclosed in heavy brackets [ ] appears in the original patent but forms no part of this reissue specification; matter printed in italics indicates the additions made by reissue.

*This application is a continuation of International Application PCT/JP90/00876, filed on Jul. 6, 1990.*

BACKGROUND OF THE INVENTION

1. Field of the Invention

This invention relates to a pulse control apparatus for supplying machining pulses to electric disclarge machines.

2. Background of the Invention

In an electric discharge machine (EDM) a switching element supplies machining pulses to the gap formed between a machining electrode and a workpiece. This switching element is controlled by gate signals.

However, control of the pulse width of these gate signals, i.e., off-time control and on-time control, generally differs between diesinking type EDMs and wire type EDMs.

Therefore, combining circuits for diesinking type EDMs and wire type EDMs on the same hardware is not cost-effective. Such a combination also has the drawback of increasing the size of the hardware. Another drawback of combining such circuits is that any change to the assembled hardware would require changes in the printed circuit boards from the design level. This is time consuming and could take on the order of at least one month.

Similar problems are encountered if diesinking type EDMs and wire type EDMs are used in combination. Two different logic circuits (for different combinations of processing materials and conditions) would have to be designed into the hardware, and both of the logic circuits would have to be configured to enable changing from one logic circuit to the other.

For example, in FIG. 10, a circuit including an OR-gate 1 and counter 2 is used for generating an NGP (no good pulse), indicative of a bad discharge when any one of three pulses (NGiP, NGvP, or NGτP) are present. for counting the NGPs, and for controlling the off-time interval according to the count value.

An NGiP pulse is generated when the lap current is higher than a specified value: an NGvP pulse is generated when the gap voltage is lower than a specified value: and an NGτP pulse is generated when the time $\tau_w$) between applying the voltage to the gap until discharge starts shorter than a specified time.

In FIG. 11, an AND-gate 3, OR-gate 4 and counter 2 are used to control the off-time interval according to a count value based on the number of NGP counts corresponding to the condition where both the NGiP and NGvP pulses are present or when an NGτP pulse is generated.

FIGS. 10 and 11 show relatively simple logic circuits. However, if the logic circuit shown in FIG. 10 must be changed to that shown in FIG. 11, the printed circuit board must be redesigned, resulting in a lengthy delay. This problem will occur in either diesinking type EDMs or wire type EDMs; it will also occur when a printed circuit board used in a diesinking type EDM is used in a wire type EDM, and vice versa.

SUMMARY OF THE INVENTION

In order to overcome these and other drawbacks of the prior art, the present invention is directed to a pulse control unit for an EDM where the control unit has the flexibility of achieving different logic circuit functions within one hardware package and where the control unit is cost-effective, minimized in size and, when necessary or desired, can be quickly and easily modified.

According to the present invention, a programmable IC is provided to define a specified logic circuit according to a ROM, which stores circuit function definition data for defining specified logic circuits related to discharge machining. By providing different logic circuit functions in the same hardware, the hardware is more effective and compact. In addition, the configured hardware can be changed easily because this invention provides external storage means to store the circuit function definition data for defining specified logic circuits and a CPU to supply the circuit function definition data stored in this external storage means to the programmable IC in place of the above ROM.

DETAILED DESCRIPTION OF THE PREFERRED EMBODIMENTS

Figure 1:
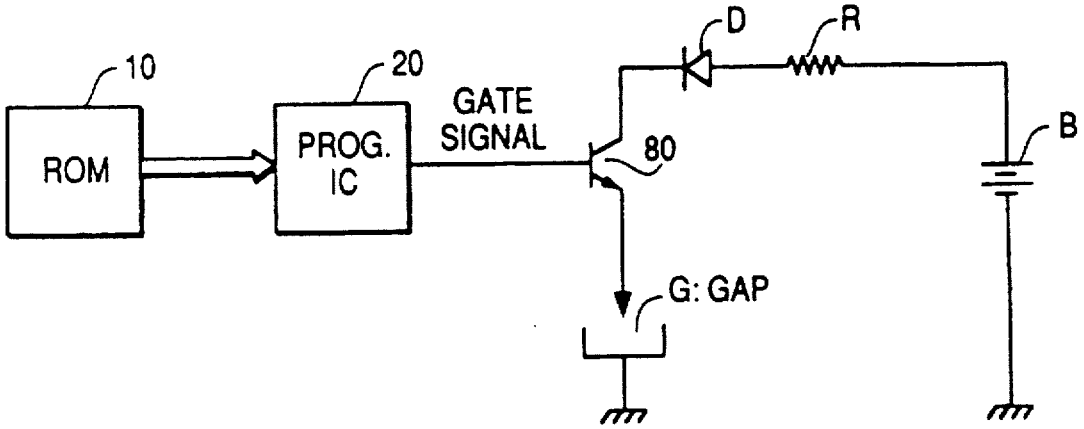
FIG. 1 shows a circuit representing an embodiment of the invention.

In FIG. 1, there is shown a ROM 10, an IC 20, a switching transistor 80, a gap G formed between a machining electrode and a workpiece, a diode D, a resistance R and a power source B. The ROM 10 is a memory that stores circuit function definition data which defines specified logic circuits relating to electric discharge machining. The IC 20 is a programmable IC that defines specified logic circuits in accordance with circuit function definition data stored in ROM 10.

The programmable IC 20 is a type of gate array and is basically the same as a PA ®, e.g., an XC2000 series or XC3000 series LCA (Logic Cell Array) manufactured in the United States by XILINX Inc.

Figure 2:
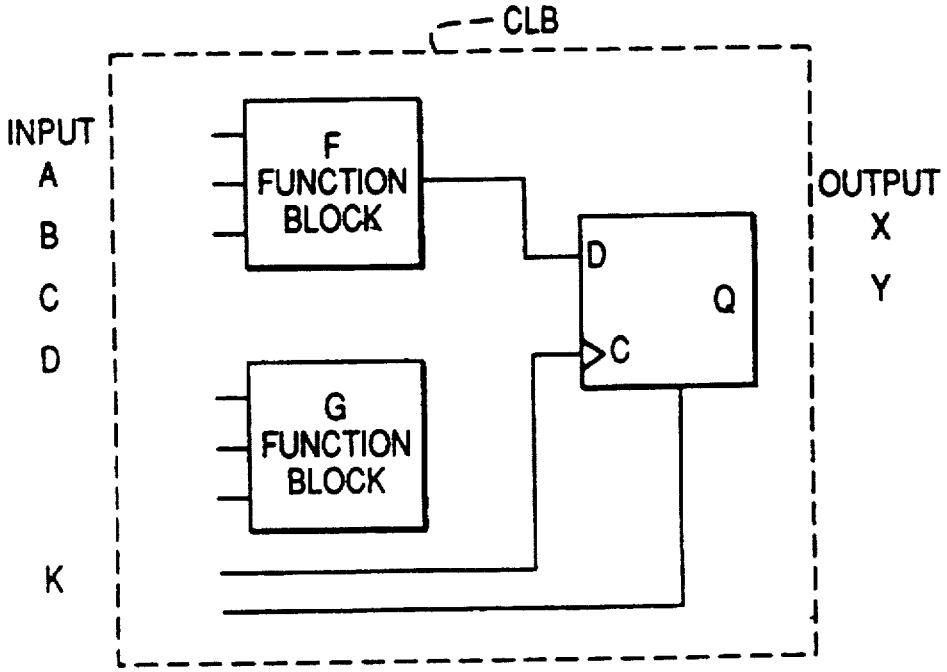
FIG. 2 is a block diagram illustrating a CLB (Configurable Logic Block), which forms the basis of the programmable IC of FIG. 1.

In FIG. 2, a configurable logic block (CLB) which forms the basis for the IC 20 of FIG. 1 is illustrated. The CLB includes four variable logic inputs (A, B, C and D), an exclusive clock input K, two outputs (X and Y), combinable function blocks (F and G), and storage elements that can be realized as a flip-flop Q of the transparent-latch type or edge-trigger type. This CLB is used to configure a required logic network by user-programmable interconnection. However, the CLB input/output interface is realized by a I/0 block (IOB).

Figure 3A:
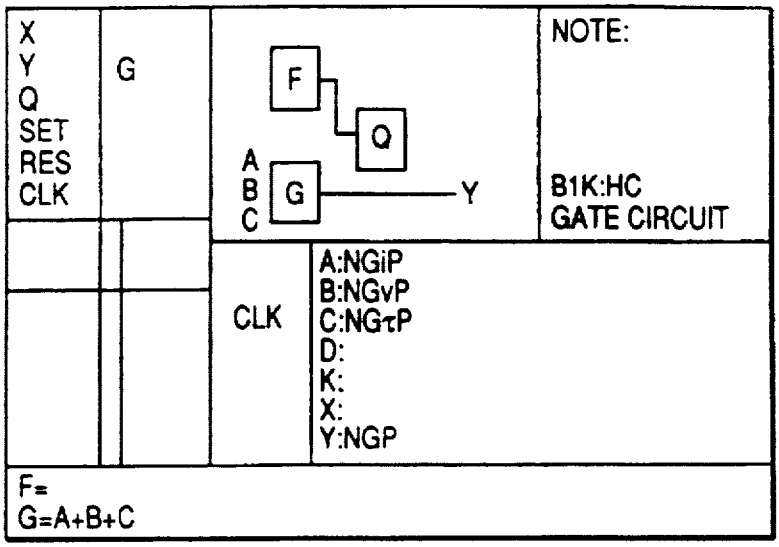
FIG. 3A is an example of a screen display which may be used with the embodiment of FIG. 1.
Figure 3B:
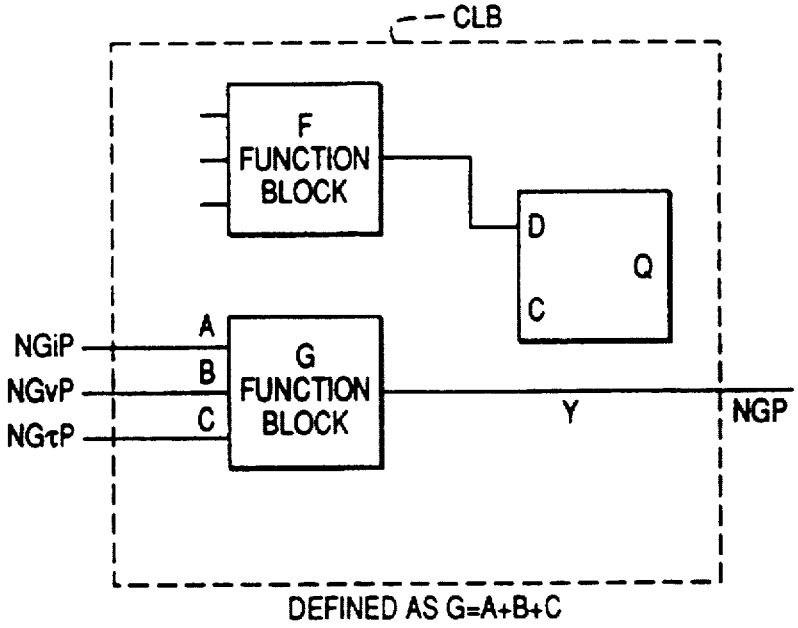
FIGS. 3B and 3C are diagrams of circuits which can be used with the embodiment of FIG. 1 when a circuit is configured to correspond for example to the OR-gate 1 shown in FIG. 10.
Figure 3C:
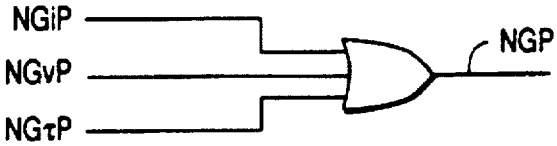
Figure 10:
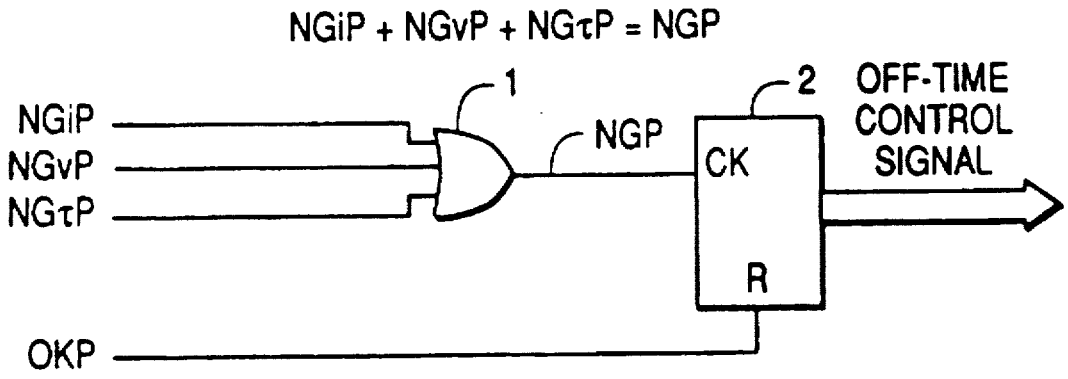
FIG. 10 PRIOR ART
FIGS. 10 and 11 illustrate prior art circuit configurations.

FIGS. 3A–C are illustrative drawings for configuring a circuit corresponding to the OR-gate 1 shown in FIG. 10. FIG. 3(A) is a block editor screen of the CLB to be used for editing the CLB. An entry of "G" (positioned to the right of "Y" in the upper left of FIG. 3(A)) defines extraction of the G function block output using output Y. The entry of G=A+B+C at the lower left defines that signal output as a logical low when any one of A, B and C inputs are at logical level 1. In this case, nothing is entered to the right of "F=", "X", "Q", "D", or "K". This indicates that the F function block, output X, flip-flop Q, input D, and clock input K are not changes in the printed circuit boards from the design used. If "NGiP", "NGvP", "NGτP" and "NGP" are entered into "A", "B", "C" and "Y" at the center portion of FIG. 3(A), this causes NGiP, NGvP and NGτP. to be input to inputs A, B, and C respectively and NGP to be supplied to output Y. NGiP (No Good Current (i) Pulse) is an output pulse which occurs when a gap current value is higher than a specified value. NGvP (No Good Voltage Pulse) is an output pulse which occurs when a gap voltage is lower than a specified value. NGτP (No Good $\tau_w$ Pulse) is an output pulse which occurs when time ($\tau_w$), which corresponds to a time between applying a voltage to the gap until the start of a discharge, is shorter than a specified time. NGP (No Good (machining) Pulse) is an output pulse that indicates a discharging state that is nonacceptable. Further, in the case where many CLBs are provided in one LCA the designation "HC" to the right of "BlK" in the "Note" section indicates that the CLB being edited in FIG. 3(A) is positioned at a position (H, C), e.g., row H (from the top) and column C (from the right). The designation "Gate Circuit" indicates the name of the LCA. Internal connections between blocks (i.e., interconnection between CLBs) are made in accordance with a switching matrix containing path transistors controlled by programs. Internal connections for CLB inputs/outputs are made by other path transistors.

FIG. 3(B) is a CLB internal connection diagram defined by the block editor screen of FIG. 3(A) FIG. 3(C) illustrates an equivalent circuit of the CLB. The operation for editing CLBs described above is detailed in "The Programmable Gate Array Data Book", published by XILINX Inc, and "XACT Logic Cell Array Development System VOL. 1 to VOL. 3 of U.S.A. XILINX Inc. Development", published by the Electronic System Dept. of Okura Shoji Co., Ltd. on Nov. 10, 1988, both incorporated by reference herein.

Procedures other than the above for editing CLBs can be adopted, e.g., a CLB can be edited by a compiler called APR (automatic placement and routing) after drawing a logic circuit diagram on the screen.

After a CLB is edited, the circuit function definition data is written into ROM 10 of FIG. 1 (in the form of a PROM) by using a specified compiler. Execution of these steps, programs the ROM 10 that stores the circuit function definition data for defining specified logic circuits relating to electric discharge machining.

Figure 4A:
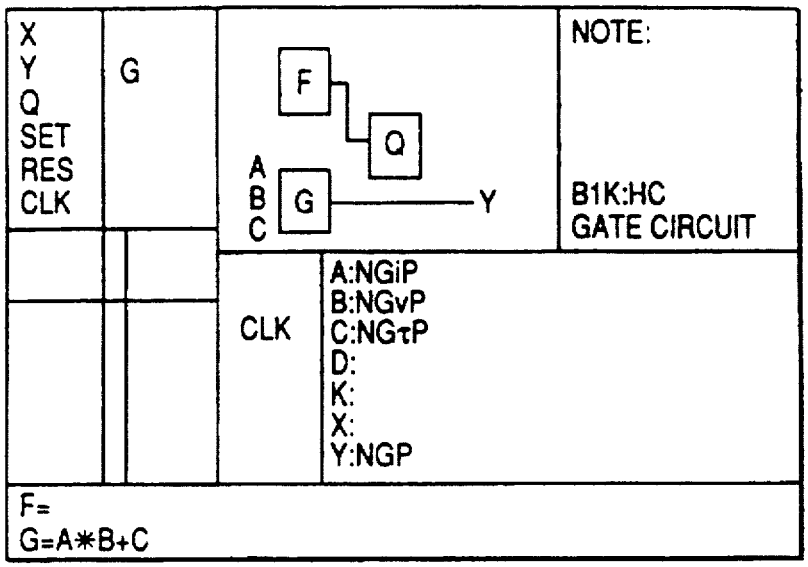
FIG. 4A is an example of a screen display which may be used with the embodiment of FIG. 1.
Figure 4B:
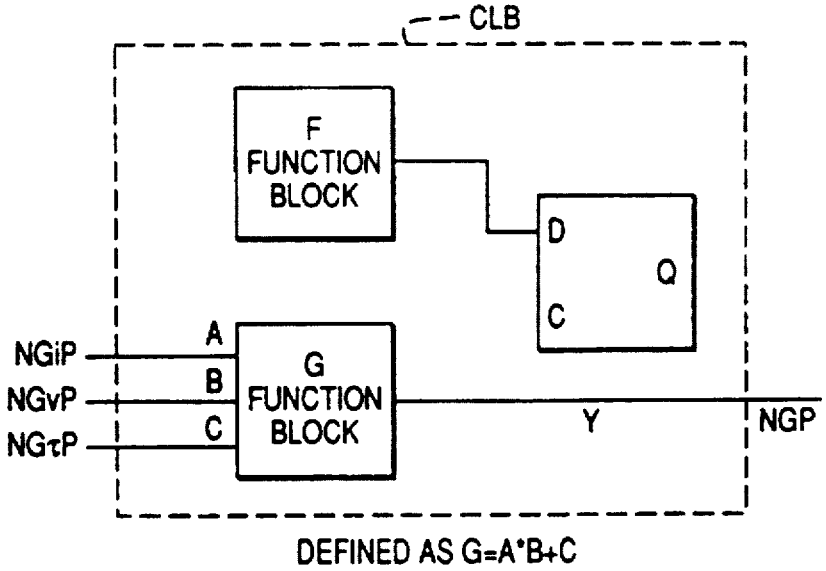
FIGS. 4B and 4C are diagrams of circuits which can be used with the embodiment of FIG. 1 when a circuit is configured to correspond for example to the AND-gate 3 and OR-gate 4 circuit of FIG. 11.
Figure 4C:
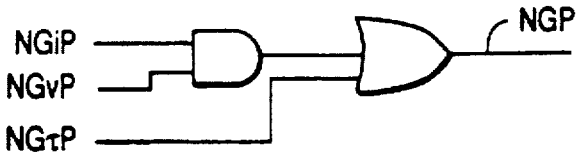
Figure 11:
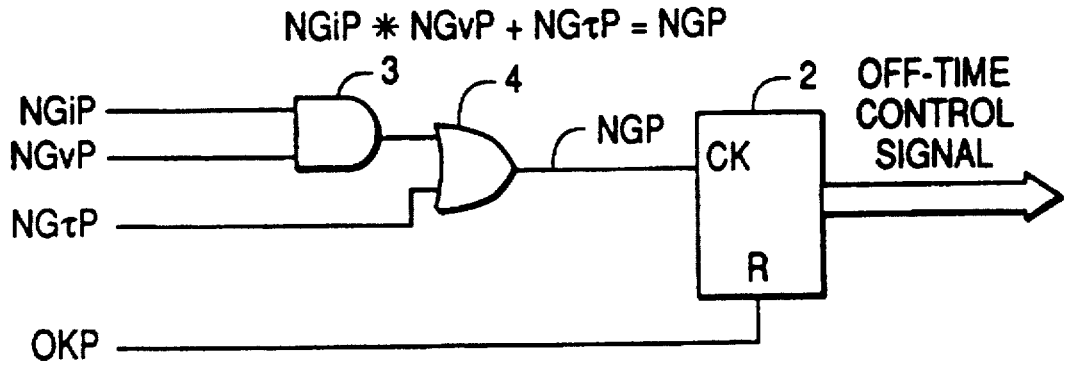
FIG. 11 PRIOR ART

FIGS. 4(A)–C) are explanatory drawings for configuring circuits corresponding to AND-gate 3 and OR-gate 4 shown in FIG. 11. FIG. 4(A) is a block editor screen for the CLB.

The editing procedure for CLB in FIG. 4(A) is basically the same as that shown in FIG. 3(A). A difference exists in entry of "A*B+C" to the right of "G=" at the lower left of FIG. 4(A). The definition of "G=A*B+C" outputs a CLB defined in FIG. 4(B) when signals are received by inputs A and B or when a signal is received by input C. FIG. 4(B) is an internal connection diagram for a CLB when CLB is edited as shown in FIG. 4(A). FIG. 4(C) shows the equivalent circuit of the CLB of FIG. 4(B).

As alluded to above, the IC 20 shown in FIG. 1 is a type of gate array. What the gate array actually consists of is determined by the circuit function definition data transferred to IC 20. This data is previously stored in the ROM 10 of FIG. 1(B). For example, data is transferred to the IC 20 from the ROM 10 when power is supplied to the electric discharge machine. The IC 20 is configured to assume various types of logic circuits according to the transferred circuit function definition data. If circuit function definition data stored in ROM 10 is changed or if a removable ROM 10 is replaced with another ROM in which new circuit function definition data is stored, the logic circuit configured in the IC 20 will change. Thus, the design of the logic circuit may be changed without changing wiring and parts arranged on the printed circuit board.

Because new control systems can be introduced without modifying hardware, less time is consumed and research and development cycles can be shortened. However, the IC 20 is preferably designed for specific applications, and the logic circuits configured in IC 20 are preferably for discharge pulse generation circuits or discharge pulse control circuits.

Figure 5:
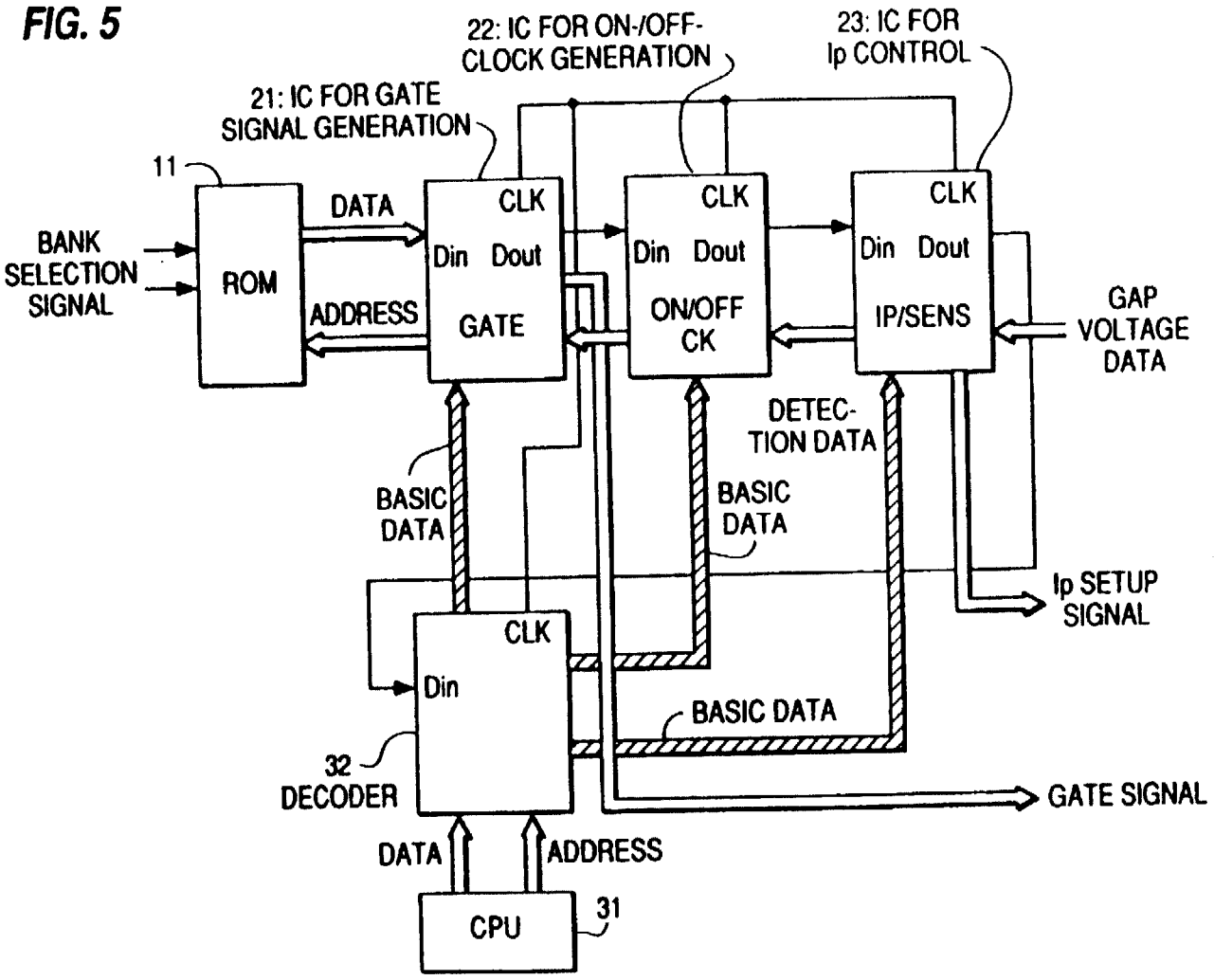
FIG. 5 is a more detailed circuit diagram of a portion of the circuit shown in FIG. 1.

FIG. 5 is a circuit drawing illustrating an embodiment of the circuit of FIG. 2. FIG. 5 is an example of the circuit in which an Ip setup signal and gate signal are generated. This example comprises a ROM 11 for storing circuit function definition data and for defining multiple types of logic circuits relating to electric discharge machining; a programmable IC 21. IC 22 and IC 23; a CPU 31 and a decoder 32. The IC 21, IC 22 and IC 23 are examples of programmable ICs that define logic circuits according to circuit function definition data defined by logic circuits stored in ROM 11. The bank selection signal selects circuit function definition data that is stored in ROM 11 for defining multiple logic circuits. Therefore, ROM 11 corresponds to ROM 10 of FIG. 1 and the programmable IC 21, IC 22 and IC 23 correspond to the IC 20 of FIG. 2. The IC 23 for Ip control generates the Ip setup signal according to gap voltage data obtained from the machining gap. Preferably, multiple transistors are connected in parallel between the gap and the pulse control unit (pulse power supply). Resistances having the same or different resistance values are connected in series with transistors. Current Ip (peak value of discharge machining current) flowing to the gap can be controlled by gating one or more of the transistors ON. Also a transistor may be set to ON according to the Ip setup signal.

The IC 23 for Ip control is a logic circuit that determines the Ip setup signal. It is also a circuit for controlling Ip according to the gap voltage. That is, IC 23 determines, according to the basic data on threshold value, etc. and gap voltage data from decoder 32, whether or not a discharge state is acceptable, and outputs detection data that indicates the result of the determination.

The IC 22 for on/off clock generation is a logic circuit that determines the width of an ON-pulse (on-time) and the width of OFF-pulse (off-time) according to detection data from IC 23. The IC 22 outputs clock signals (hereinafter "clock") having a frequency for controlling the on/off time interval corresponding to the above-mentioned detection data. The pulse frequency of this clock depends on the detection data. The on-time clock has a lower pulse frequency as the discharge state gets better, while the off-time clock has a lower pulse frequency as a discharge state becomes worse. The basic data supplied from decoder 32 to IC 22 for generating on/off clock pulses specifies the initial clock frequency at which the on/off time is controlled. Initially, the on-time clock is at its lowest pulse frequency and the off-time clock at its highest pulse frequency.

IC 21 for gate signal generation is a logic circuit that generates a gate signal according to the output data of IC 22. This gate signal is supplied to the drive circuit that drives switching elements connected in series to gap G. The IC 21, which generates the gate signal, includes a comparator which receives a predetermined number of clock pulses (basic data) for on-time control/off-time control from the decoder 32 and clock pulses having a frequency corresponding to on/off time interval from IC 22. The comparator compares clock pulses having the frequency corresponding to the on/off time interval with the predetermined number of pulses to count for on-time control. When both match, the on-time control is completed. The comparator then compares clock pulses having a frequency corresponding to the off-time interval with the predetermined number of pulses to count for off-time control. When both match, off-time control is completed. Gate signals generated by the above procedure are output by IC 21.

Therefore, when the detection data is indicative of an acceptable gap state, the frequency of on-time clock from IC 22 becomes lower, and the on-time interval of the output gate signal grows longer. When the detection data is indicative of an unacceptable gap state, the frequency of off-time clock from IC 22 for on-off-clock generation becomes lower, and the off-time interval of the output gate signal gets longer. In this circuit, the decoder 32 supplies predetermined Ip values and base data for the on/off clock to IC 21, IC 22 and IC 23 according to the data and address given by CPU 31. Circuit function definition data to define the specified logic circuit relating to electric discharge machining is supplied by the ROM 11 to the IC 21, IC 22 and IC 23. Data from ROM 11 is supplied to the data input port Din of IC 21. If IC 21 is filled, data is then supplied, in series, to the input port Din of IC 22 via the input port Din of IC 21 and the output port Dour of IC 21. If IC 22 is filled, data is then supplied from input port Din of IC 21 for Ip control to IC 23 via IC 21 and IC 22. The addresses transferred from IC 21 for gate signal generation to ROM 11 are necessary for reading the circuit function definition data written in ROM 11. These addresses are incremented one by one. Decoder 32 can be replaced with a ROM. If so, CPU 31 can be omitted.

Figure 6A:
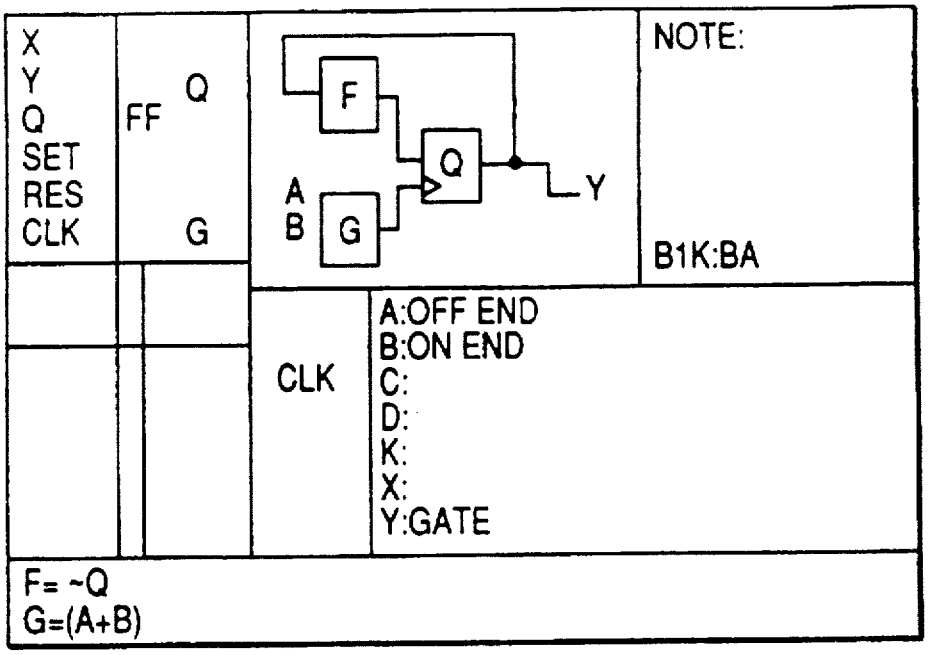
FIG. 6A is an example of a screen display which may be used with the embodiment of FIG. 1.
Figure 6B:
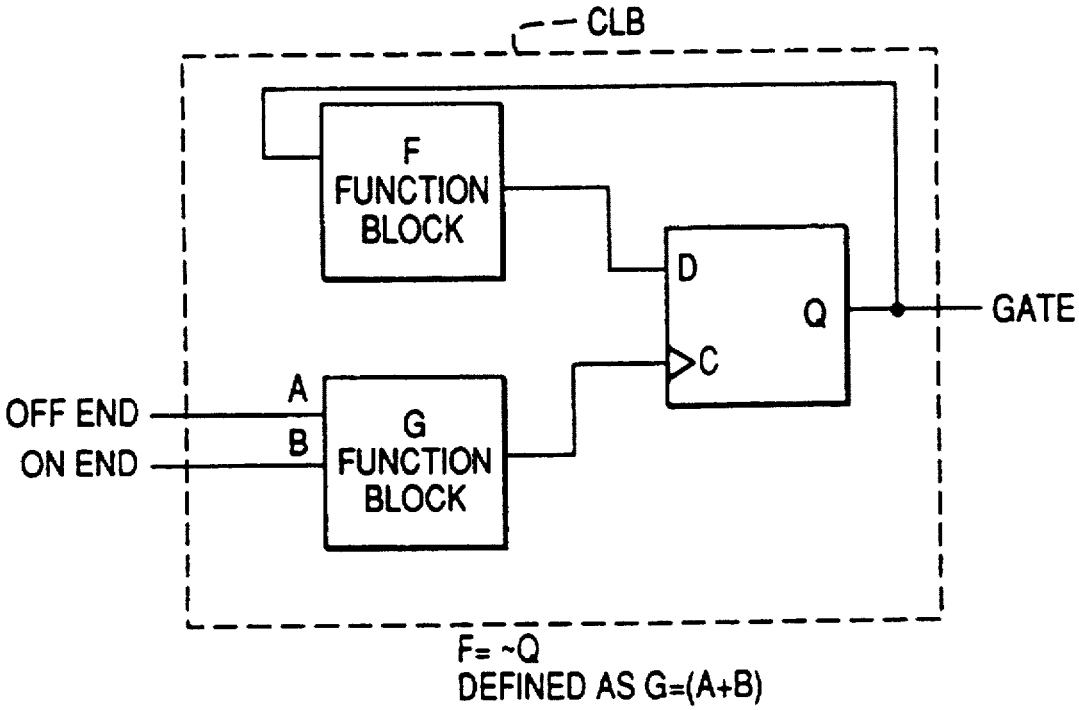
FIGS. 6B and 6C are diagrams illustrating a partial configuration of IC 21 of FIG. 5 for generating the gate signal.
Figure 6C:
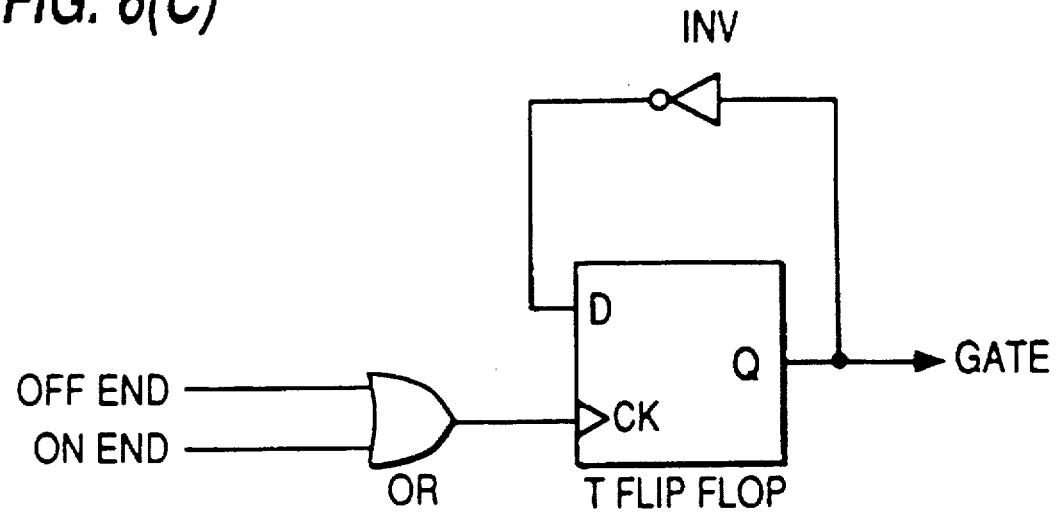
Figure 6D:
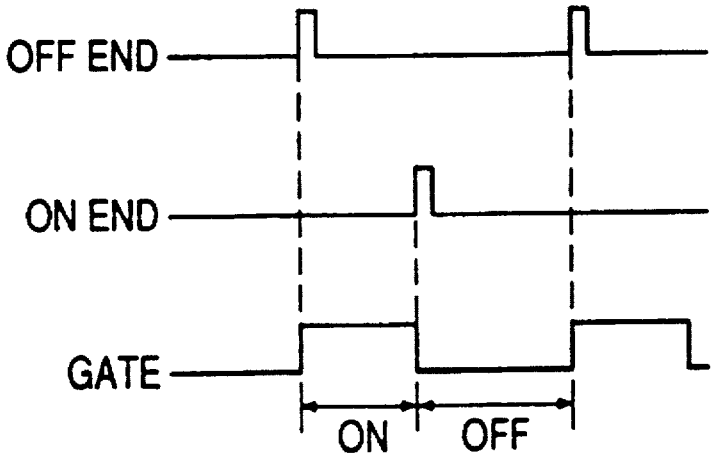
FIG. 6D is a timing diagram corresponding to the circuits of FIGS. 6B and 6C.

FIG. 6(A) is an example representing a part of IC 21 shown in FIG. 5 for gate signal generation. This example illustrates a circuit, in which a GATE signal is generated according to Off End and On End pulses. An Off End pulse is generated when the off-time count is completed. An On End pulse is generated when the on-time count is completed, FIG. 6(A) is a block editor screen for the CLBs. FIG. 6(B) is an internal connection diagram for CLBs edited according to FIG. 6(A). FIG. 6(C) is the equivalent circuit diagram of a circuit configured according to FIG. 6(B). Using the block editor screen shown in FIG. 6(A) the following editing is made. The output of flip-flop Q is extracted using output Y and flip-flop Q is used as a flip-flop (flip-flop Q may also be used as a latch and, if so, "L" is entered to the right of "Q" instead of "FF"). An output signal from the G function block is used as a clock of flip-flop Q, and the output of flip-flop Q is reversed in the F function block (symbol "~" is the same as symbol "bar" and indicates that a signal shown next to symbol "~" is reversed). The logical expression (Boolean algebra) at the G function is G=(A+B), "Gate" (gate signal) is entered as output Y, and "Off End" as input B.

The input D terminal of flip-flop Q is always connected to the output of the F function block. In other words, use of flip-flop Q requires use of the F function. When CLB is edited as above and implemented, a gate signal, having the on-time interval from Off End to On End and the off-time interval from On End to Off End, is output as shown in FIG. 6 (D).

FIGS. 7(A)–(D) represent an example of a part of the IC 22 of FIG. 5 for on/off clock generation. This example comprises a circuit used to switch between a 1-MHz clock and a 100 KHz clock output. For example, if the counter counts a 1-MHz clock and then the comparator L, compares this count value with an 8-bit signal to control on/off time, on-time/off-time up to 256 μsec can be controlled. However, the diesinking type EDM requires approximately 2-msec time width (on-time/off-time interval). If the diesinking type EDM uses 8-bit signals. it will require a 100-KHz clock. Switching clock frequencies between a 1-MHz clock and a 100-KHz clock, for instance, requires (as an example) the system shown in FIG. 7(A). The input SEL is a selection signal that switches between a 1-MHz clock and 100-KHz clock. The input SYSCK is a clock for synchronization and is set in the example to 10 MHz.

Figure 7A:
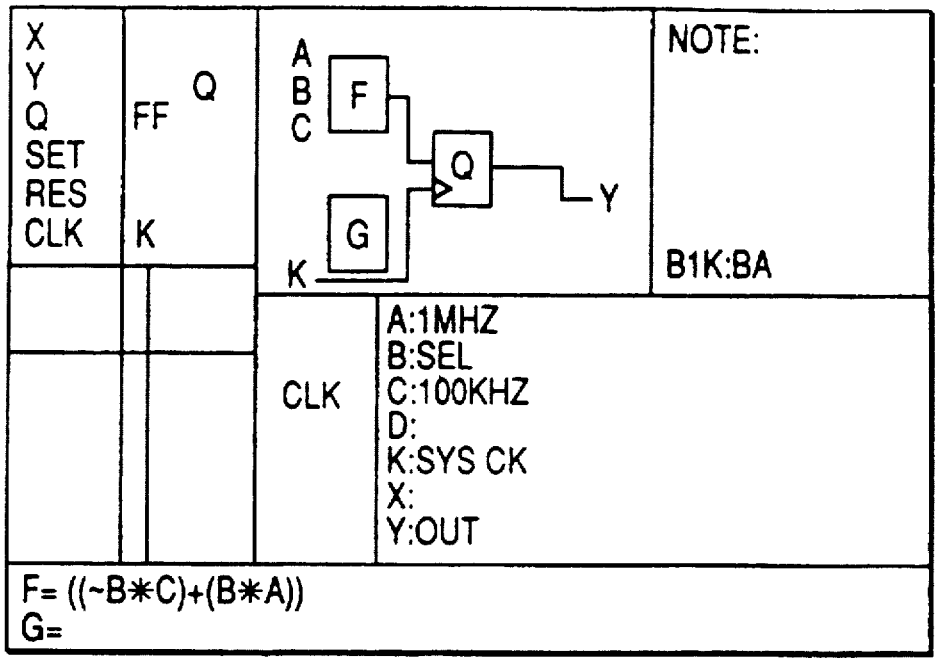
FIG. 7A is a diagram which represents a partial configuration of IC 22 of FIG. 5 for generating on/off clock pulses.
Figure 7B:
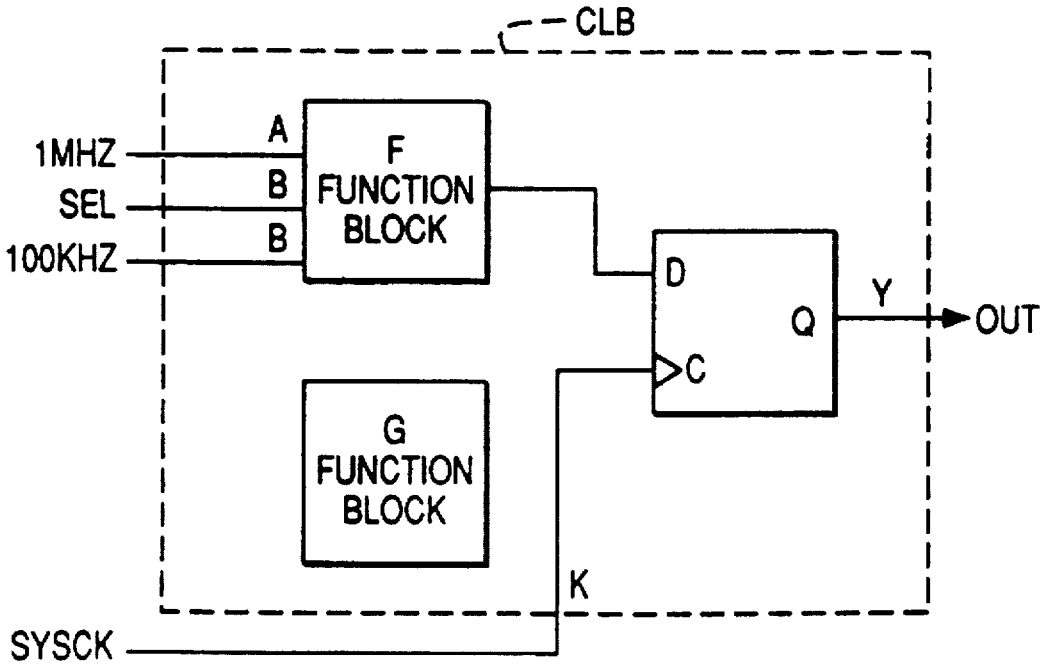
FIGS. 7B and 7C are diagrams of circuits which may be used with the embodiment of FIG. 1 when the circuit is configured to correspond for example to the OR-gate 1 of FIG. 10.
Figure 7C:
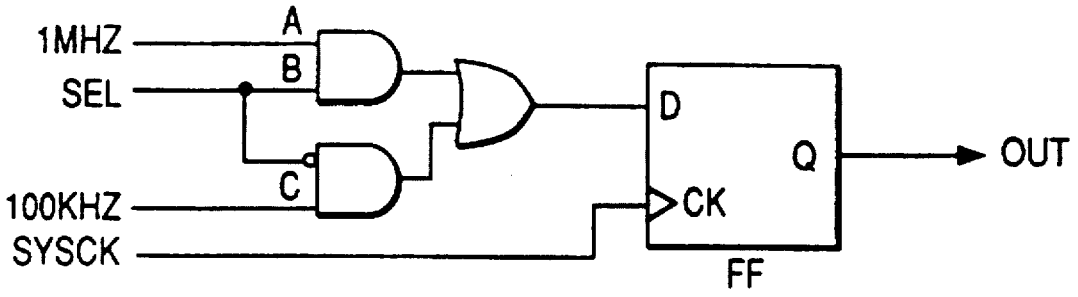

FIG. 7(A) shows a CLB block editor screen. FIG. 7(B) illustrates a CLB internal connection diagram where CLB editing is made in accordance with FIG. 7(A). FIG. 7(C) illustrates the equivalent circuit drawing.

In the block editor screen shown in FIG. 7(A), CLB is edited as follows: The output of the flip-flop Q is used as output Y, the flip-flop Q being configured as a flip-flop, and the K input clock is used as a clock for flip-flop Q. The logical expression (Boolean algebra) used at the F function block indicates a logical sum which results from adding a logical product of the reverse signal of input B and input C to a logical product of input B and input A. In this example, a 1-MHz clock, SEL, 100-KHz clock and SYSCK clock are respectively entered as inputs for A, B, C and K, and the signal name of output Y is defined as Out.

Figure 7D:
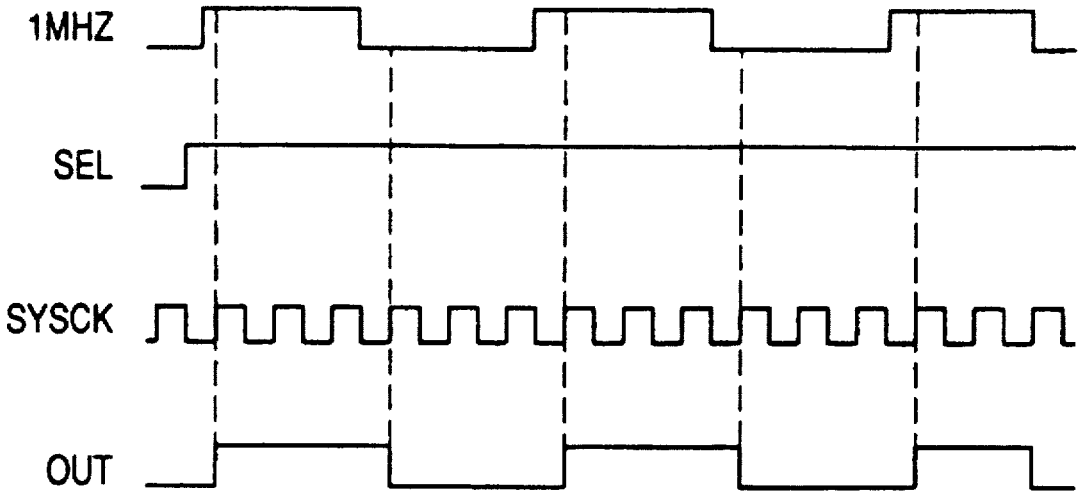
FIG. 7D is a timing diagram corresponding to the circuits of 7B and 7C.

After editing as above, if SEL is set to "1", a 1-MHz clock, as shown in FIG. 7(D), is extracted using output Y. If SEL is set to "0", a 100-KHz clock is extracted using output Y.

An example illustrating the function of IC 23 for Ip control is set forth in FIG. 5.

FIG, 8 illustrates an example of the gate signal generation circuit GP shown in the above embodiment an peripheral circuits. The gate signal generation circuit GP comprises the following: ROM 81 which stores software for CPU 56, ROM 52 and ROM 53 which store circuit function definition data for defining specified logic circuits; RAM M; bank selection circuit 55; dual port RAM 57; clock generator 58; and IC 60 for generating programmable gate signals. IC 60 for gate signal generation is an example reprinting a programmable IC that defines spcified logic circuits according to circuit function definition data of ROM 52 and ROM 53.

Figure 8:
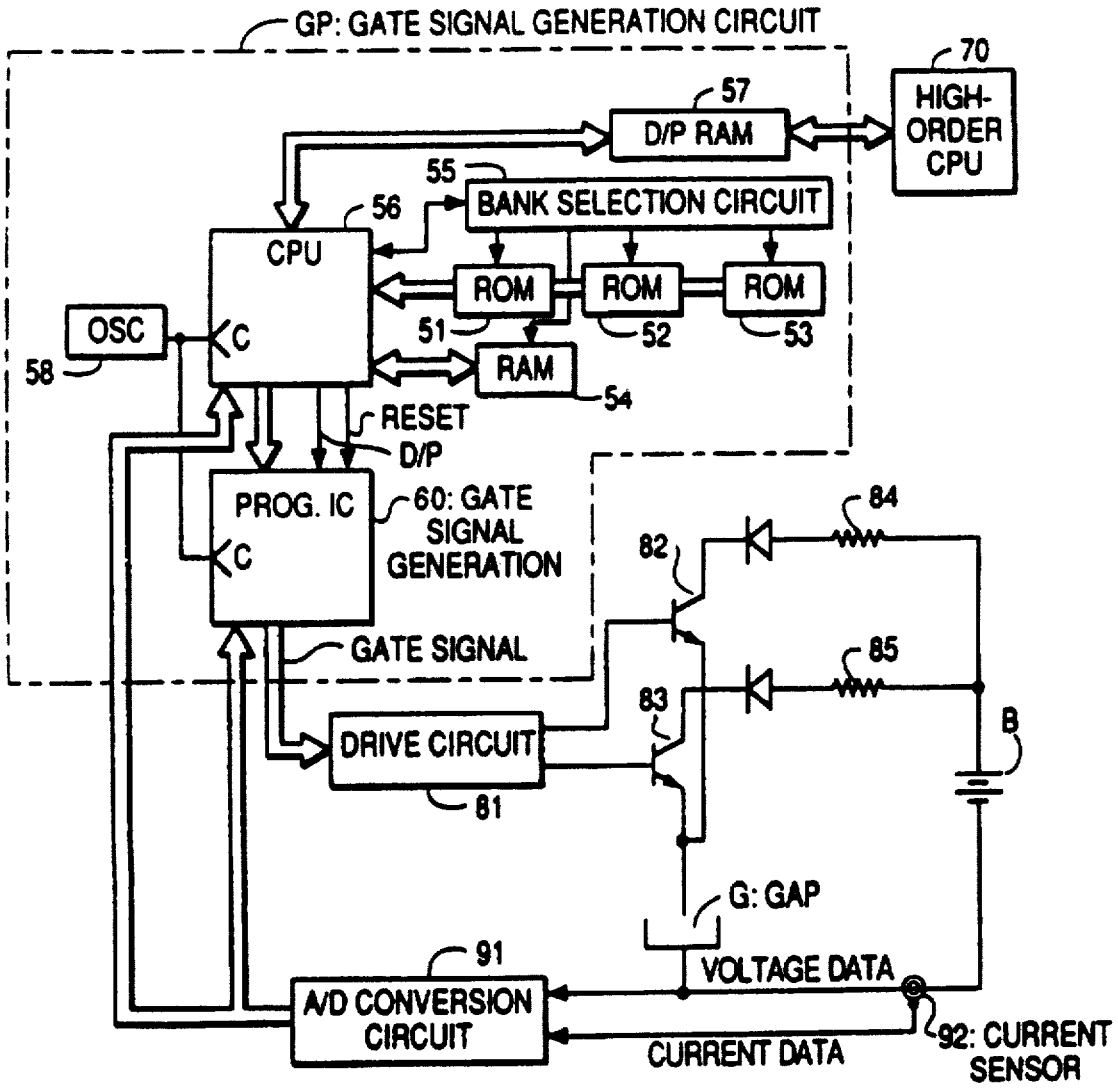
FIG. 8 is a circuit diagram representing a gate signal generating circuit (GP) in the embodiment of FIG. 5.

In addition, FIG. 8 shows mater CPU 70, drive 20 circuit 81, switching transistors 82 and 83, resistances 84 and 85, A/D conversion circuit 91, and current sensor 92. The example shown in FIG. 8 assumes that ROM stores circuit function definition data which defines a logic circuit for e.g., a graphite electric and that ROM 53 stores circuit function definition data which defines logic circuit for e.g., a copper machining electric and for e.g., iron as a workpiece.

When performing electric discharge machining by using a graphite electric as in the above example, a signal for indicating use of graphite electric is input using an operation panel (not illustrated). This signal goes to CPU 56 which transfers the circuit function definition data stored in ROM 52 to IC 60 for gate signal generation via bank selection circuit 55. The CPU 56 supplies a reset signal and a D/P signal at the same time. Thus, the logic circuit is defined in IC 60 for gate signal generation according to the circuit function definition data stored in ROM 52. From a functional viewpoint, this definition indicates that logic circuit is configured in IC 60 according to the circuit function definition data stored in ROM 52.

If an abnormal condition occurs in the course of electric discharge machining, the IC 60 controls a quick operation for lengthening the off-time interval of the gate signal, shortening the on-time interval of the gate signal, or reducing the Ip value. These quick operations are carried out because use of graphite electrode may easily result in an arc when an abnormal condition occurs.

When a signal indicating, that e.g., copper is used as a machining electrode and iron is used a workpiece is input using the operation panel, the signal is transferred to the CPU 56 which then specifies ROM 53 via bank selection circuit 55 and transfers circuit function definition data stored in ROM 83 to IC 60. The CPU supplies the reset signal and the D/P signal at the time, and the logic circuit for gate signal generation is defined in IC 60 according to circuit function definition data stored in ROM 53. From a functional view point, this definition indicates that a logic circuit is configured in IC 60 according to the circuit function definition data stored in ROM 53. In the above state, if an abnormal condition occurs in the course of electric discharge machining. IC 60 performs control of a gradual operation for lengthening the off-time interval of the gate signal, shortening the on-time interval of the gate signal. or reducing the Ip value. Such gradual operations are acceptable because it is less likely for arcing to occur when copper is used as a machining electrode and iron is used as a workpiece.

The above example provide two ROMs containing circuit function definition data that defines IC 60 for gate signal generation. However, three or more ROMs can be used for IC 60 to configure three or more logic circuits that independently adopt different methods for controlling electric discharge machining. If a board has many ROMs, more space is taken. Alternately, a master CPU 70 which stores multiple circuit function definition data for defining logic circuits that carry out multiple control methods can be used. This master CPU 70 transfers the data to CPU 56 via dual port RAM 57. The circuit function definition data is temporarily stored in RAM 54 and is then transferred to IC 60 for gate signal generation. This reduces ROM installation space on the gate signal generation circuit GP.

The voltage and current data is directly transferred to IC 60 from A/D conversion circuit 91 and is also transferred to CPU 56. Based on the logic circuit architected in IC 60 according to the circuit function definition data directly transferred from A/D conversion circuit 91 to IC 60, gate signals are quickly transferred to drive circuit 81 and machining operation is carried out at a high speed. On the other hand, the voltage and current data transferred from A/D conversion circuit 91 to CPU 56 are used in CPU 56 for calculating machining energy, the result of the calculation is transferred to IC 60, and based on the logic circuit architected in IC 60, the pulse width and Ip values are adjusted according to the result of the calculation. The calculation methods, the data to be calculated and calculation intervals are determined by CPU 56 itself.

Figure 9:
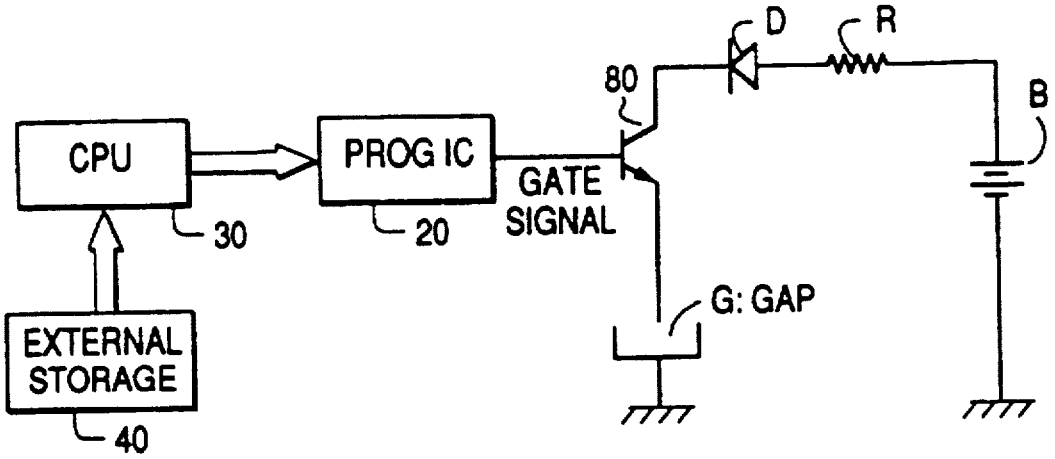
FIG. 9 is a circuit drawing representing an alternative embodiment of the present invention.

FIG. 9 is a circuit drawing representing another embodiment of this invention. In the embodiment in FIG. 1, the circuit function definition data for defining the circuits of IC 20 is stored in ROM 10. However, in the embodiment of FIG. 9, the circuit function definition data is transferred from external storage 40 via CPU Therefore, the external storage 40 and CPU 30 effectively correspond to ROM 10 of FIG. 1.

The above preferred embodiments are applicable to die-sinking type EDMs, wire type EDMs, small-hole drilling machines and welding machines. The invention is not limited to the foregoing, but is only limited by the claims appended hereto.

I claim:

1. In an electric discharge machine, a pulse control apparatus comprising:

means for specifying circuit function definition data from a set of circuit function definition data for defining a desired circuit configuration;

storage means for storing said set of circuit function definition data;

programmable circuit means operatively connected to receive from said storage means the specified circuit function definition data for structuring logic circuits into said desired circuit configuration specified by said circuit function definition data; and pulse control means responsive to said desired circuit configuration for providing control pulses to said electric discharge machine.

2. The apparatus of claim 1 wherein said storage means is located remote from said pulse control means.

3. The apparatus of claim 1 wherein said storage means comprises a programmable CPU.

4. The apparatus of claim 1 wherein said specifying means defines said desired circuit configuration according to the type of machining that will be performed and said programmable circuit means structures said logic circuits into said desired circuit configuration.

5. In an electric discharge machine, a pulse control apparatus comprising:

selectable storage means for storing data that indicates a desired circuit configuration;

programmable circuit means operatively connected to receive from said storage means said data, for structuring logic circuits into said desired circuit configuration specified by said storage means, and pulse control means responsive to said desired circuit configuration for providing control pulses to said electric discharge machine;

wherein said selectable storage means may be replaced with an alternative storage means which stores data for indicating an alternate circuit configuration.

* * * * *